United States Patent [19]

Turnquist

[11] Patent Number: 4,722,791

[45] Date of Patent: * Feb. 2, 1988

[54] METHODS FOR DETACKIFYING, FLOATING, CONCENTRATING, SEPARATING AND REMOVING FLOATING SOLID PAINT MATERIAL

[76] Inventor: Sanfred E. Turnquist, Rte. 1, Box 4, Caddo Gap, Ark. 71935

[*] Notice: The portion of the term of this patent subsequent to Apr. 29, 2003 has been disclaimed.

[21] Appl. No.: 830,355

[22] Filed: Feb. 18, 1986

Related U.S. Application Data

[63] Continuation-in-part of Ser. No. 568,148, Jan. 4, 1984, Pat. No. 4,585,557.

[51] Int. Cl.4 ............................................. B01D 35/00
[52] U.S. Cl. ................................... 210/320; 209/208; 210/525
[58] Field of Search ..................... 210/195.1–195.4, 210/515, 519, 521, 528, 523, 531, 532.1, 536, 540, 919, 921, 167, 242.3, 923, 320, 525; 55/228, 240, DIG. 46; 98/115.2; 118/326, DIG. 7; 209/208

[56] References Cited

U.S. PATENT DOCUMENTS

| | | | |
|---|---|---|---|
| 1,441,560 | 1/1923 | Connors | 210/221.2 |
| 2,746,605 | 5/1956 | Baum | 210/221.1 |
| 2,788,954 | 4/1957 | Paasche | 261/5 |
| 2,793,185 | 5/1957 | Albrektsson et al. | 210/703 |
| 2,805,844 | 9/1957 | McMaster | 261/3 |
| 2,813,074 | 11/1957 | Banks et al. | 210/703 |
| 2,994,432 | 8/1961 | Schluter | 210/101 |
| 3,121,680 | 2/1964 | Ciabattari | 210/703 |
| 3,175,687 | 3/1965 | Jones | 210/221.1 |
| 3,286,844 | 11/1966 | Juell | 210/523 |
| 3,301,779 | 1/1967 | Kovacs | 210/705 |
| 3,418,236 | 12/1968 | Mail | 210/221.2 |
| 3,479,281 | 11/1969 | Kinkindai et al. | 204/149 |
| 3,516,230 | 6/1970 | Saubesty | 55/228 |
| 3,547,800 | 12/1970 | Pei Tai Pan | 204/149 |
| 3,642,618 | 2/1972 | Silva | 210/706 |
| 3,679,056 | 7/1972 | Haymore | 210/221.1 |
| 3,726,780 | 4/1973 | Harnden et al. | 204/149 |
| 3,756,933 | 9/1973 | Greenberg | 204/151 |
| 3,817,865 | 6/1974 | Austin | 204/149 |
| 3,853,735 | 12/1974 | Harnden et al. | 204/149 |
| 3,929,640 | 12/1975 | Dohnert | 210/195 |
| 3,945,918 | 3/1976 | Kirk | 210/703 |
| 3,966,598 | 6/1976 | Ettelt | 210/703 |
| 4,009,160 | 2/1977 | Smith | 210/195 |
| 4,096,066 | 6/1978 | Kearney | 210/195 |
| 4,216,085 | 8/1980 | Chittenden | 210/703 |
| 4,220,078 | 9/1980 | Walker et al. | 98/115 |
| 4,372,854 | 2/1983 | Szereday | 210/242.3 |
| 4,425,870 | 1/1984 | Marshke | 118/326 |
| 4,469,595 | 9/1984 | Napadow | 210/111 |
| 4,472,181 | 9/1984 | Herrlander | 55/228 |
| 4,501,671 | 2/1985 | Bazell | 210/781 |
| 4,585,557 | 4/1986 | Turnquist | 210/320 |

Primary Examiner—Frank Sever
Attorney, Agent, or Firm—Robert M. Ward

[57] ABSTRACT

The improved methods of the present invention function to detackify, float, substantially concentrate, separate, and remove such floating solid materials comprising paint solids from the surface of a volume of spray booth liquid, generally comprising water. In some embodiments, the method may be practiced using apparatus functing in two stages. In other embodiments, a single stage may be utilized. In the first or preliminary concentration stage, the apparatus is directed to a treatment volume that is disposed adjacent an untreated volume of liquid. An entry means is disposed therebetween for flow of the surface portion of the untreated volume thereover. A baffle is disposed across the treatment volume and extends to a depth beneath the surface to permit the flow of the liquid thereunder, but to entrain the flow of solid paint materials and to channel the flow of solid materials into a take-off chamber over a take-off weir. In the second stage of the detackifying, floating, concentrating, separating, removing apparatus useful to practice the present invention, an influent flow of solid containing liquid is provided with a paint detackifier additive and a paint coagulant additive to effect floatation. Next, the influent flow is directed horizontally across and near the surface thereof to accumulate a sludge on the surface of the volume. The accumulated sludge is then removed from the surface, and effluent is withdrawn from the bottom portion of the treatment volume, and returned to the source, such as a spray booth header.

22 Claims, 5 Drawing Figures

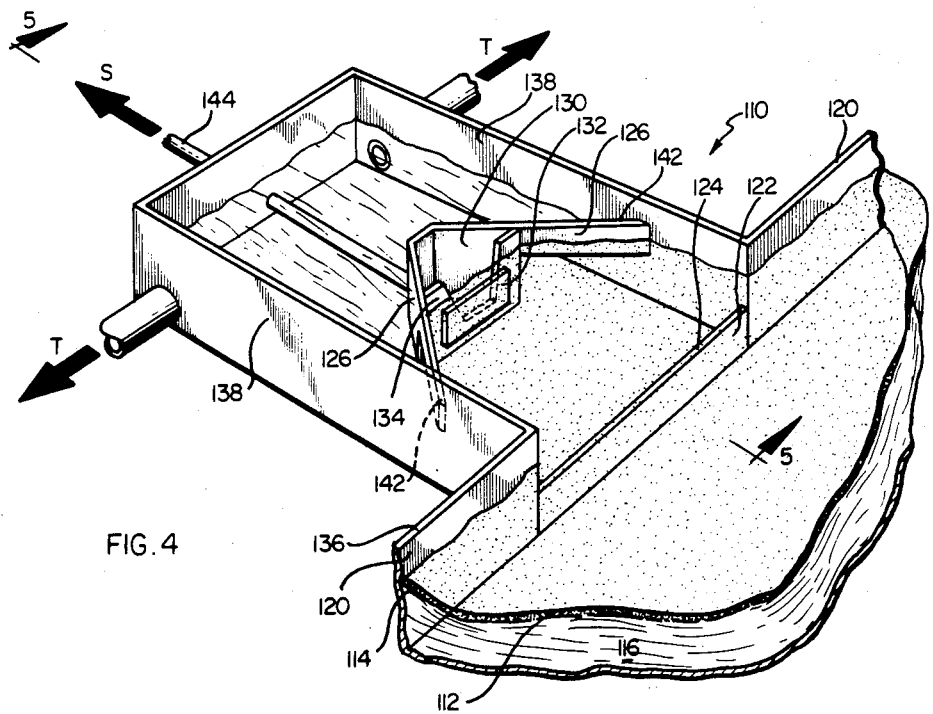

METHODS FOR DETACKIFYING, FLOATING, CONCENTRATING, SEPARATING AND REMOVING FLOATING SOLID PAINT MATERIAL

BACKGROUND OF THE INVENTION

This application is a continuation-in-part of application Ser. No. 568,148 filed on Jan. 4, 1984, and now issued as U.S. Pat. No. 4,585,557, issued Apr. 29, 1986.

The present invention relates generally to improved methods for purification and recycling of waste water, and more particularly to improved methods for substantially detackifying, floating, concentrating, selectively separating, and removing floating paint solid materials, such as overspray paint, from the surface of an untreated volume of liquid, such as the liquid in a paint spray booth.

The treatment of waste water has been a problem of significant proportions. The particular problem of the accumulation paint which settles out within a spray booth which is used in conjunction with a production line, such as in the automobile industry, is one of major difficulty and expense.

Typically, when products are spray painted in a spray booth, the products to be painted are moved by means of a production line in front of a waterfall or wall of water to serve as a backdrop for spray painting. The paint which does not engage and coat the product to be painted strikes the flowing water of the wall of water in the form of overspray and is carried downwardly into a tank of water. In the prior art, the paint overspray would settle out in the spray booth and would require periodic shutting down of the spray booth for removal thereof.

Various techniques have been employed in an attempt to solve the problem of separating the paint overspray from the water, disposing of the paint overspray and returning the water to the spray booth for further use in conjunction with the waterfall. Attempts have been made to utilize various filtration techniques and various means of floating the paint solids. Present techniques of achieving flotation of the paint include the use of chemicals, and even self-floating paint solids. The methods of the present invention are designed to improve these present techniques.

A major difficulty in the prior art techniques has been a lack of efficiency of separation, which has been aggravated by attempts at one-stage separation. These problems have been further aggravated by various turbulent flows within the treatment tank, including vortex effects, which have materially reduced the efficiency of the take off from the spray booth.

Accordingly, in view of the shortcomings of the prior art, it is an object of the methods of the present invention to materially reduce the difficulty associated with the prior art without the necessity of resorting to complicated, expensive or labor intensive equipment.

It is a further object of the methods of the present invention to provide methods which are utilizable by easily retrofitting existing systems, and which may be easily installed on new systems.

It is yet a further object of the methods of the present invention to provide methods which may function on a single spray booth, or alternatively as a part of a centralized system.

It is also an object of the methods of the present invention to provide methods which are essentially maintenance-free.

It is an additional object of the methods of the present invention to provide means for vastly improving spray booth operation, such as by providing improved circulation of the surface water flow, rapid and continual removal of contaminants from the spray booth, improved performance of flotation chemicals due to circulation increase, and to improve clarification and decontamination of water provided to the spray booth header pumps, thus reducing spring booth nozzle clogging and overspray conditions in the spray booth.

The improved methods of the present invention will be better understood by reference to the following drawings, description of the invention, and claims.

SUMMARY OF THE INVENTION

The improved methods of the present invention may be carried out by means of preferred embodiments of apparatus having a single or two stage separation of solids from the associated liquid. In the alternative first stage, the floating solids may be removed from the spray booth with only the surface portion of the liquid, thereby to concentrate substantially the floating liquids. In the second stage, the live plant is detackified, floated, and floating solids are further concentrated in the form of a sludge, which is then removed, and the associated liquid is finally returned to the spray booth.

In such first stage of the recommended apparatus for use in connection with the methods of the present invention, walls are provided defining a treatment volume. The treatment volume is disposed adjacent to the container for the untreated volume of liquid, which in preferred embodiments is the spray booth. Entry means, preferably in the form of an entry weir, is disposed between the untreated volume of the spray booth and the treatment volume. The floating solids material passes over the top edge of the entry weir into the treatment volume. A baffle is disposed across the surface of the treatment volume and extends downwardly a distance sufficient to prevent flow thereunder of the floating solids material, but will permit flow thereunder of the associated liquid. A take-off chamber is disposed within the treatment volume for receipt of the floating solids material. A take-off weir is disposed in the front portion of the take-off chamber, such that the floating solids and only a portion of the associated liquid will flow over the take-off weir and into the take-off chamber, for channeling to the second, or sludge removal, stage. The liquid flowing from the treatment volume underneath the baffle is returned to the spray booth.

In the second or sludge removal stage, which may be utilized alone, an influent flow of paint containing water is received into a sludge treatment volume. Detackifiers and floatation promoters are added, along with alkaline PH adjustment means in preferred embodiments. The influent flow is then directed across and near the surface of the sludge treatment volume to permit the floating solids to accumulate on the surface thereof as a sludge. The sludge is then removed from the surface of the sludge treatment volume. Substantially clear effluent liquid is withdrawn from the bottom portion of the sludge treatment volume, preferably in an amount equal to the amount of the influent received into the sludge treatment volume. Such effluent is returned to the spray booth for continued use.

BRIEF DESCRIPTION OF THE DRAWING

Exemplary embodiments of the improved method of the present invention may be carried out in connection with apparatus as set forth in the drawings, in which:

FIG. 4 is a fragmented, perspective view of the first stage of such apparatus for carrying out the present invention; and FIG. 5 is an enlarged longitudinal cross-sectional view taken along line 5—5 of FIG. 4.

DETAILED DESCRIPTION OF PREFERRED EMBODIMENTS

Figure 1:
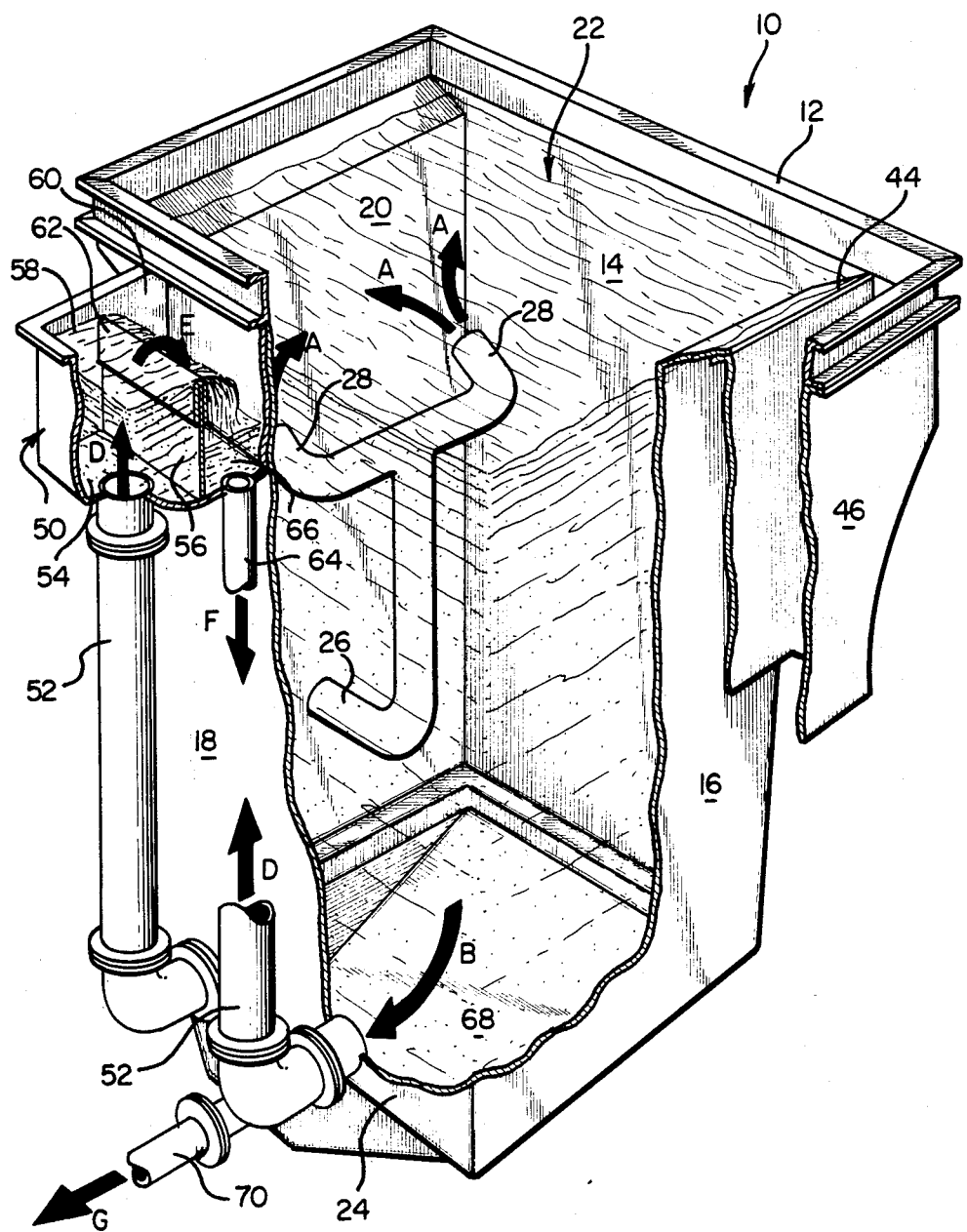
FIG. 1 is a fragmented perspective view of the second, or sludge accumulation, stage of an apparatus for carrying out the methods of the present invention.

The improved methods of the present invention for substantially detackifying, floating, concentrating, selectively separating, and removing floating paint solids material from the surface of an untreated volume of associated liquid may include two stages. The first stage may include a treatment volume which is disposed adjacent to the container for the untreated volume of liquid. The untreated volume of liquid may in preferred embodiments be a spray booth tank, and the floating solids comprise paint over-spray.

Entry means are disposed between the untreated volume and the treated volume. The entry means are preferably a form of an entry weir. The entry weir has a top edge which is disposed at a level just beneath that of the surface of the untreated volume for flow of the floating paint solids material from the surface of the untreated volume thereover into the treatment volume. A baffle is disposed across the treatment volume and extends above the surface thereof and below the surface thereof to a depth sufficient to prevent the flow thereunder of the floating paint solids material, but to permit flow thereunder of the associated liquid.

A take-off chamber means for receiving the floating paint solids material and for channeling the solids material therefrom is provided. The take-off chamber means is disposed adjacent to the treatment volume. A take-off weir is disposed at the front portion of the take-off chamber means and between the treatment volume and the take-off chamber means. A channeling means for directing the flow of the floating paint solids material from the treatment volume into the take-off chamber is also provided.

The first stage of such apparatus thus functions to urge the floating paint solids material to flow from the untreated volume, past the entry means, into the treatment volume, therefrom to be channeled over the take-off weir, and into the take-off chamber means for discharge.

The entry weir and the take-off weir are preferably adjustable for disposition at selected respective vertical levels to permit adjustment of the volume of flow thereover. The entry weir is also disposed to be substantially longitudinally co-extensive in preferred embodiments with a wall of the container for the untreated volume.

The first stage of such apparatus for carrying out the present invention also preferably includes a treated liquid chamber, which is disposed on a side of the baffle opposite the treatment volume. The treated liquid chamber receives liquid which is substantially free of floating paint solids material from under the baffle. Associated with the treated liquid chamber are treated liquid suction means, which are connected to the treated liquid chamber for removing treated liquid therefrom. In preferred embodiments, these treated liquid suction means feed into the spray booth header system, thereby to return the liquid which is substantially free from any solids material.

The treated liquid means preferably comprise means for removing a substantial volume of treated liquid. When such a substantial volume is removed from the treated liquid chamber, the untreated volume of floating paint solids and associated liquid is urged to flow into the treatment volume. In turn, liquid from the treatment volume is urged to flow into the treated liquid chamber.

The baffle means of the present invention preferably comprises a pair of walls and the channeling means thereof includes disposition of the baffled walls at an anble of less than 180 degrees to each other.

Also, in such preferred embodiments of such apparatus, a conduit is connected to the take-off chamber at a bottom portion thereof for removal from the take-off chamber of the somewhat concentrated and separated paint solids material, which may then conducted to the second or sludge accumulation stage, which stage is described in greater detail hereinbelow. In alternative embodiments, such second stage may be used independently or with other preliminary concentrating means.

In preferred embodiments, the second sludge or accumulation and removal stage of apparatus for carrying out the present invention comprises a sludge tank having walls for containing a volume of solids containing water, for example such as that from the first stage, described supra, which water contains therein floating paint solids material to be removed. Such sludge accumulation volume has a surface level zone near the top thereof, and a deep level effluent zone near the bottom of the tank. Means for adding detackifier and floatation promoters are provided. Influent means for receiving a flow of the solids containing water are provided for directing the influent flow within and horizontally across and near the surface of the surface level zone to permit the solids to float on the surface thereof to accumulate thereby a sludge on the surface of the volume. The sludge is removed by a scraper means for scraping across the surface of the volume and up an upwardly sloping portion of the tank wall to remove the accumulated sludge. A sludge box is preferably disposed adjacent the tank for receiving the scraped sludge.

Surface level control means including at least one surface level control weir are disposed adjacent the sludge tank for receiving effluent therefrom, and effluent conveying means are provided for conveying the effluent from the deep level effluent zone of relative freedom from particulate contamination to the surface level control weir for recycling.

The sludge box is preferably located adjacent the tank and opposite the influent means. The scraper means preferably scrapes across the surface of the volume in the same direction as the flow of floating paint solids material which is directed within and horizontally across the surface level zone.

Such exemplary apparatus for carrying out the present invention also preferably includes on one of the sludge tank walls an upwardly sloping portion disposed at the top thereof which slopes towards the sludge box for cooperative engagement with the scraper means. By means thereof, the sludge may be directed up the upwardly sloping portion by the scraper means and into the sludge box.

The surface level control weirs preferably conprise container means having a weir partition therein to define weir inflow and weir outflow chambers. The weir inflow chamber defines a liquid surface level substantially even with the surface level of the tank volume. This structure results in an equilibration between the level of liquid in the weir inflow chamber and the level of liquid in the tank whenever there is an addition of influent to the tank, with the excess liquid spilling over the weir partition into the weir outflow chamber.

The effluent conveying means preferably comprises conduit means for receiving the effluent from the deep level effluent zone of relative freedom from solids material contamination through an opening in the lower portion of the tank wall and conveying the same to a lower portion of the weir inflow chamber. These are conduit means connected to the weir outflow chamber near the bottom portion thereof for gravity drainage therefrom.

A sump portion is preferably disposed at the bottom of the tank and has a sump drainage conduit disposed below the level of the effluent conveying means for draining the cleaning the tank as becomes necessary.

The influent means of the sludge stage of such exemplary apparatus for carrying out the methods of the present invention may in some embodiments comprise conduit means disposed within the tank for directing the flow of solids material and associated water against an adjacent tank interior surface to be deflected to flow oppositely within and horizontally across the surface level zone. The conduit means provided may be bifurcated or may have multiple openings or single broad opening directed horizontally across the tank. Such conduit means functions to set up a loop-shaped circulating current within the sludge tank wherein solid material which does not immediately float is redirected to the surface until it does in fact float.

Referring now to the drawing and first to FIGS. 4 and 5 thereof, wherein the first stage of one apparatus for carrying out the present invention, generally 110, is depicted therein. Such first stage 110 of such apparatus functions to substantially detackify, float, concentrate, selectively separate and to remove floating paint solids material 112 from the surface 114 of an untreated volume 116 of associated liquid. First stage 110 includes a treatment volume 118 which is disposed adjacent to the container 120 for untreated volume of liquid 116. Entry means in the form, preferably of an entry weir 122, is disposed between the untreated volume 116 and the treatment volume 118. Entry weir 122 has a top edge 124, which is disposed at a level beneath that of the surface 114 of the untreated volume 116 for flow of the floating solids material 112 from the surface 114 of the untreated volume 116 thereover into the treatment volume 118. A baffle 126 is disposed across the treatment volume 118 and extends above the surface 128 thereof and below the surface 128 thereof to a depth sufficient to prevent the flow thereunder of the floating solids material 112, but to permit flow thereunder of the associated liquid.

Take-off chamber means 130 for receiving the floating solids material 112 and for channeling the solids material 112 therefrom, is provided. The take-off chamber means 130 is disposed adjacent to the treatment volume 118. A take-off weir 132 is disposed at the front portion 134 of take-off chamber means 130, and between the take-off chamber means 130 and the treatment volume 118. Baffle 126 serves as a channeling means for directing the flow of the floating solids material 112 from the treatment volume 118 into the take-off chamber 130.

The first stage 110 of such apparatus functions to urge the floating solids material 112 to flow from the untreated volume 116, past the entry weir 122, into the treatment volume 118, therefrom to be channeled over the take-off weir 132, and into the take-off chamber 130 for discharge.

The entry weir 122 and the take-off weir 132 are preferably adjustable for disposition at selected respective vertical levels to permit adjustment of the volume of flow thereover. Entry weir 122 is also disposed to be substantially longitudinally co-extensive in preferred embodiments with a wall 136 of the container 120 for the untreated volume 116.

The first stage 110 of such apparatus also preferably includes a treated liquid chamber 138 which is disposed on the side of baffle 126 opposite the treatment volume 118. The treated liquid chamber 138 receives treated liquid 140 which is substantially free of floating solids material 112 from under baffle 126. Treated liquid chamber 138 also preferably includes treated liquid suction means (See Arrows T,T) connected to the treated liquid chamber 138 for removing treated liquid 140 therefrom. These treated liquid suction means T,T in preferred embodiments feed into the spray booth header system, thereby to return the treated liquid 140, which is substantially free from any solids material 112.

The treated liquid suction means T,T preferably comprises means for removing a substantial volume of treated liquid 140. When such substantial volumes are removed from the treated liquid chamber 138, the untreated volume of floating solids 112 and associated liquids 116 is urged to flow into treatment volume 118. In turn, floating solids 112 from treatment volume 118 are urged to flow into the treated liquid chamber 130.

Baffle 126 preferably comprises a pair of walls 142, 142 and the channeling means thereof includes disposition of baffle walls 142, 142 at an angle of less than 180° to each other as shown particularly in FIG. 4.

Figure 2:
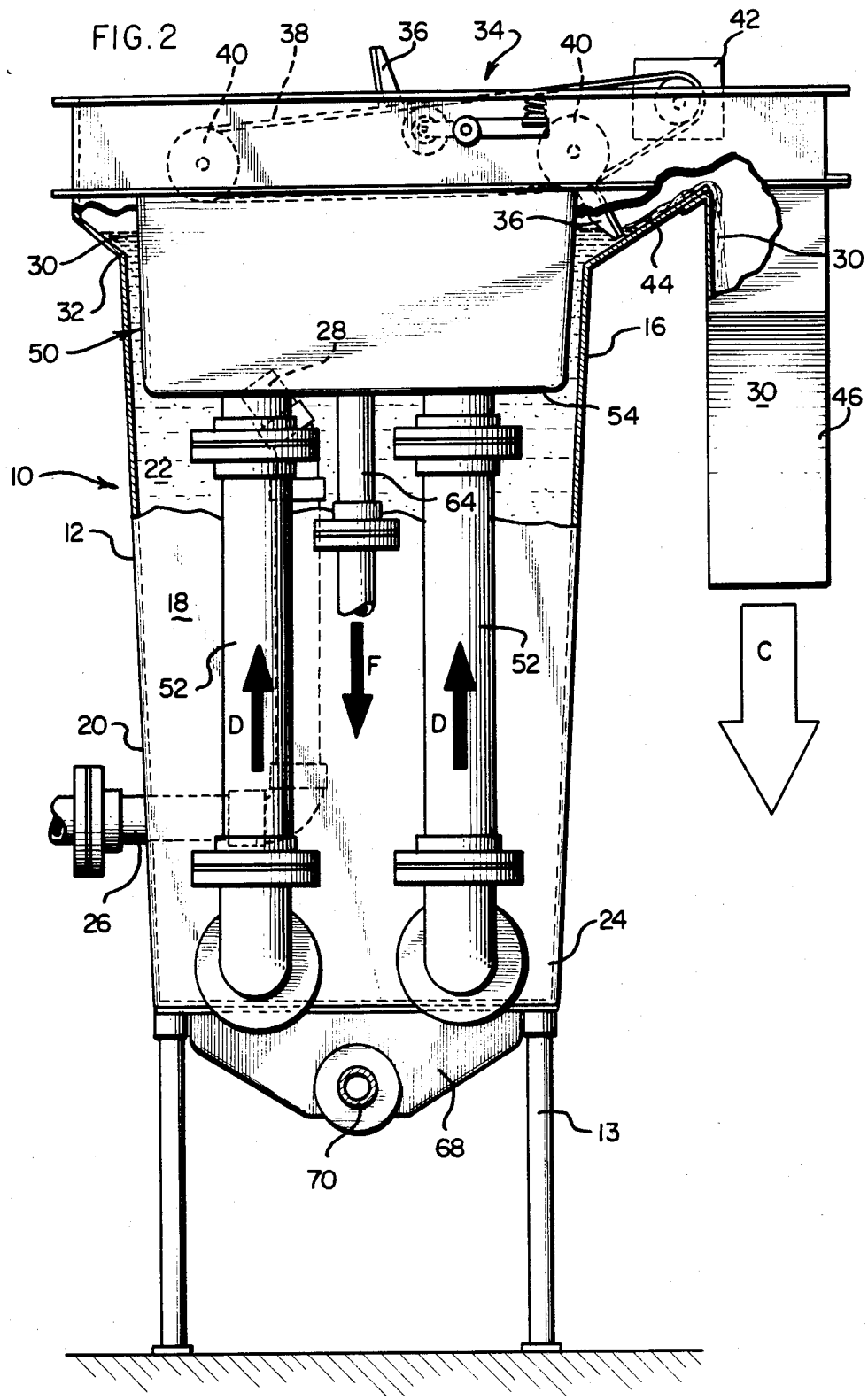
FIG. 2 is an enlarged side view of the embodiment of FIG. 1 of the sludge accumulation stage of such apparatus with a portion of the sludge tank cut away to illustrate the surface level with sludge accumulated thereon.
Figure 3:
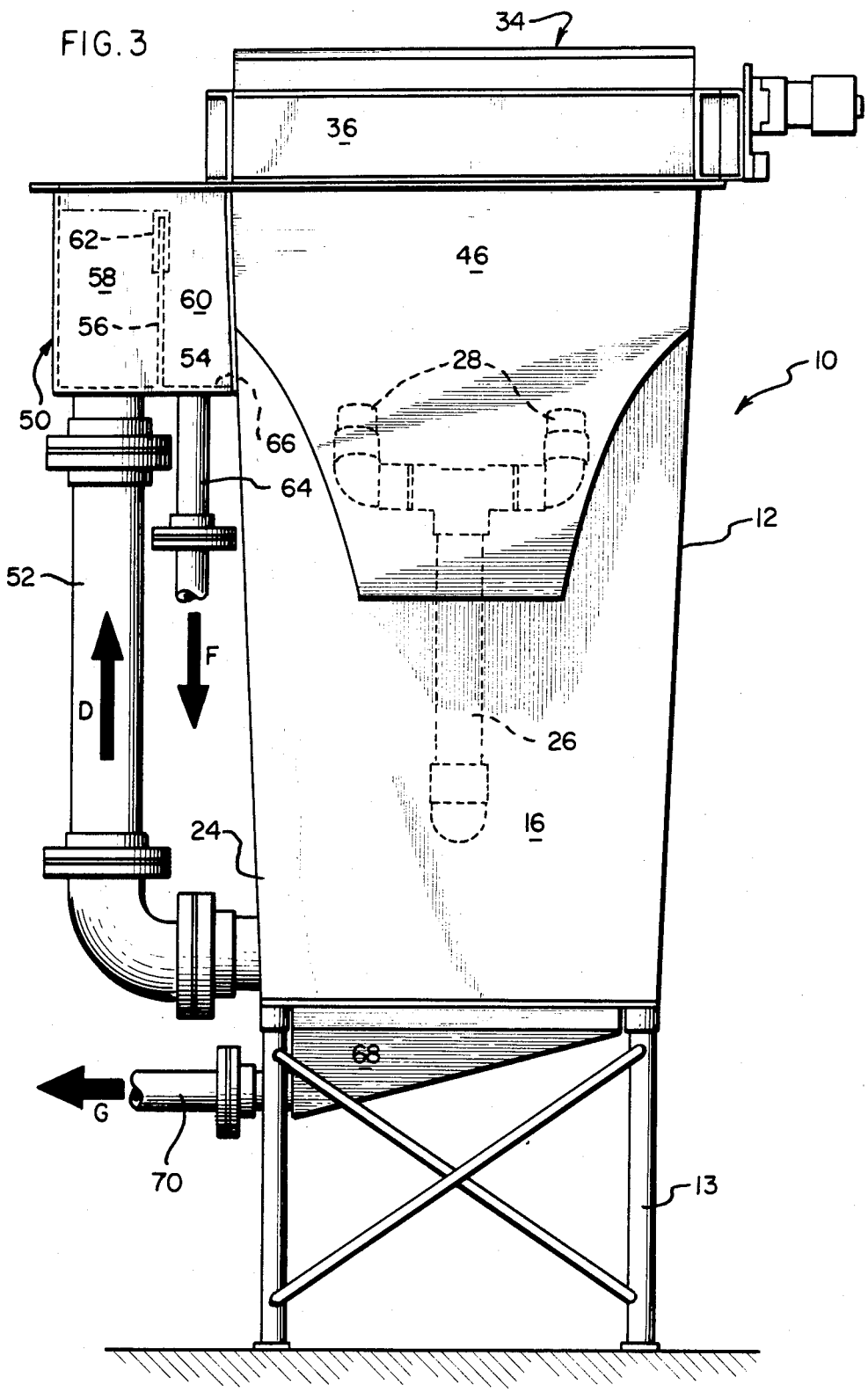
FIG. 3 is an enlarged front view of the embodiment of the sludge accumulation and removal stage as illustrated in FIGS. 1 and 2, as viewed from the sludge box side of the apparatus.

Also in such preferred embodiments, a conduit 144 is connected to take-off chamber 130 at a bottom portion 146 thereof for removal from take-off chamber 130 of the concentrated separated solids material 148, as shown in FIG. 5, which material 148 is then conducted to the sludge accumulation and separation stage, as depicted in FIGS. 1, 2 and 3 thereof.

Referring to the second or sludge accumulation and disposal stage as exemplified in FIGS., 1, 2 and 3 in particular, such sludge stage generally 10 comprises a sludge tank 12 supported on a sludge tank support frame 13 and having walls 14, 16, 18, and 20 for containing a volume generally 22 of influent water containing floating solids material to be removed therefrom, such volume 22 being received from the first stage generally 110, as set forth in FIGS. 4 and 5, supra. A surface level zone near the top of the volume 22 is formed in the vicinity of Arrows A of FIG. 1. The volume 22 also has a deep level effluent zone. See Arrow B of FIG. 1 near the bottom portion 24 of sludge tanke 12.

Influent means in the form of a conduit 26 which may have bifurcated portions 28, 28 enters tank 12 through the wall 20. Influent conduit means 26 is provided for directing the flow within and horizontally across the surface level zone, and in a direction opposite to that of Arrows A in FIG. 1. As described, supra, solids which do not immediately float are recirculated in a loop-shaped current, by means for such bifurcated portions 28, 28. The result is to accumulate a sludge 30 on the surface 32 of the volume, as shown in FIG. 2.

As shown in FIGS. 2 and 3, a scraper means generally 34 is provided for scraping across the surface 32 of the volume 22 to remove the accumulated sludge 30. Scraper means 34 preferably comprises a plurality of blades 36 extending across the surface 32 of the volume which are connected at either end to chain drives 38. In some embodiments, chain drives 38 are driven across pulleys 40 by motor 42 to cause the horizontally extending scraper blades 36 to scrape across surface 32 of volume 22 to scrape the sludge 30 up an upwardly angling portion 44 of tank wall 16 and to sludge box 46. In alternative preferred embodiments, pneumatic driven scraper means, and with self-reversing carriage, may be utilized. Sludge box 46 is disposed adjacent the front tank wall 16 for ease of removing sludge 30 from sludge box 46. See Arrow C.

A surface level control means in the form of at least one surface level control weir generally 50 is disposed adjacent one of the side tank walls 18 and is supplied with effluent through preferably dual upwardly extending effluent conduits 52, 52, which open into the bottom portion 54 of weir 50. See Arrows D, D. Weir 50 contains a weir partition 56 to define a weir inflow chamber 58 and a weir outflow chamber 60 to equilibrate the level of the liquid in weir inflow chamber 58 with that of tank 12. The effluent liquid in weir inflow chamber 58, when additional influent liquid (Arrows A) is added to the tank, spills over the top 62 of weir partition 56 into weir outflow chamber 60 to be drained. See Arrow E. Weir outflow chamber 60 is drained by means of a weir outflow conduit 64 is disposed at the bottom portion 66 of weir outflow chamber 60. See Arrow F.

A sump portion 68 is provided at the bottom of tank 12 for draining and cleaning the tank through an opening in the lower portion of the tank wall by means of a sump drainage conduit 70. See Arrow G.

Preferred embodiments of such apparatus for carrying out the present invention are designed specifically to process floatable paint sludge generated from large industrial spray boothes, as set forth more distinctly in the examples hereof. However, other applications are contemplated as being within the scope thereof.

In such preferred applications, the methods of the present invention replaces conventional filtration methods. The methods of the present invention functions without filter media, and instead transfers floating paint sludge from the spray booth reservoir in some embodiments to the first stage of apparatus for initial consolidation and concentration, and from there to the second stage of such apparatus, where it is further accumulated and substantially concentrated in the form of a sludge on the surface. In applications where the spray booth is more than 30 to 40 feet in length, more than one first stage apparatus may be necessary.

In some applications, supplementary surface circulation nozzles may be used in the spray booth to direct floating paint sludge to the entry weir, although in many such applications, no such supplemental nozzles would be necessary.

The capacity of the sludge tank is approximately 450 gallons, with a flow rate capacity of approximately 100 gallons per minute. This high flow-to-capacity ratio enables the apparatus to maximize its paint sludge handling capabilities.

A non-clogging recessed impeller vortex pump is preferably utilized for operating the second stage of the present invention. Such pump allows passage of large particles without direct impeller contact, which has proved necessary when paint conditions periodically result in "live" sludge paint. Dougle mechanical seals within the pump/motor combination are continuously flushed with fresh water to prevent pump failure from possible introduction of "live" paint.

While preferred embodiments of such apparatus for carrying out the present invention function to service floating detactified paint sludge, the present apparatus will also function under less than ideal conditions. One such reason for this versatility of functioning is the continuous flow rate of 80–100 gallons per minute. Since no actual filter medium is used, "live" paint is minimized, and damage from "live" paint is also minimized. Also, paint material that does in fact sink is automatically returned to the spray booth reservoir for recycling from the bottom of the second stage sludge tank. Accordingly, the sludge tank of the second stage is thus self-flushing.

The sludge tank of the second stage and the sheet components of the first stage are preferably constructed from a 3/16" steel sheet. All flanges, tank supports, weir boxes and sludge discharge areas are preferably integral with the tank body. Interior surfaces and all welded surfaces are preferably treated with shop-applied rust proofing. The outside surfaces are shop-primed and preferably finished in a heavy duty grade of rust-proofing paint.

The tank support structure is fabricated preferably from square or rectangular structural steel tubing ASTM A-36 and is braced as required with $3''\times3''\times\frac{1}{4}''$ HRS angles. Connections therebetween are shop-welded whenever possible, and all other connections utilize angle braces or gusset plates not less than $\frac{1}{4}''$ in thickness and bolted with hexagonal machine bolts not less than $\frac{3}{8}''$ in diameter.

The scraper support frame is preferably fabricated from $2''\times2''\times\frac{1}{4}''$ HR angle iron with welded corners and is carried on semi-steel groove rollers supported by grease-lubricated roller bearrings. The actuator screw for the sludge scraper assembly is made from $\frac{5}{8}''$ stock with a length of 38". The actuator screw is driven by means of a rotary vane air motor, such as that available from the Gast Manufacturing Corporation, together with a suitable air control lubrication apparatus, speed reducer, and coupling. The scraper blade and sludge depository area are fabricated from stainless steel to obtain necessary flexibility and to inhibit any sludge adhesion.

The pump which is preferably utilized as the influent pump on the sludge stage appartus is a standard all-iron, recessed impellar, end suction centrifugal pump with 4" flange suction and discharge connections and is equipped with a double mechanical seal, including pressure regulators for seal flush. Such a pump is available from the Midland Corporation. Such pumps are capable of passing solids up to $3\frac{7}{8}''$ in diameter. The pumps in preferred embodiments are mounted on channel steel bases and include flexible coupling and coupling guards. Power for the pumps should be provided by 5HP, 1150 RPM, 30/60 hz/460 volt, 254U frame, 7EH spec. Delco Motors Rated: 100 GPM at 27′ TDH at 1150 RPM.

The control panel in preferred embodiments includes a Square D model, SCA-21 combination starter, NO/NC contacts, oil tight start stop station in covers, pilot light-115 volt, 35VA central transformers, 3′B′ heater elements, and 2 Asco model 8210 D2 solenoid valves-115 volts.

The following examples are provided to those of ordinary skill in the art for greater understanding of exemplary embodiments of the methods of the present invention, and no unnecessary limitation is intended thereby.

EXAMPLE I

The following report covers the results obtained and observations made during the paint booth control tests run at the BOC Janesville, WI plant using TEXO LP-1235, LP-1227, and LP-1128* in three independent and different paint systems. The tests were run in three independent paint systems, each spraying a different type of paint. The only thing common to all three systems is the type of chemical treatment and that each system has been fitted with a Palin "AQUA-FLO"** consolidation unit or units. Each system will be covered individually, and drawings of each system are included which show the systems the way they are and modifications recommended to improve the efficiency of the systems.
* Products of the Texo Corporation, 2801 Highland Avenue, Cincinnati, Ohio 45212.
** Trademark of applicants.

EXAMPLE IA

Truck Sheetmetal Booth

TYPE OF BOOTH: Down draft booth with no water walls
TYPE OF BACK SECTION DESIGN: Modified Koch booth cobra nozzles (SEE DRAWINGS)
SIZE OF BOOTH: 29,000 gals., approx. 100′ long
TYPE OF PAINT: DuPont 51% solid enamels
VOLUME OF PAINT SPRAYED/8 HOURS: 25 gals.
NUMBER OF UNITS PER HOUR: 27
NUMBER OF SHIFTS PER DAY: 2-9 hour shifts, 6 days per week
TYPE OF APPLICATION EQUIPMENT: Hand held electrostatic guns(6)
ESTIMATED TRANSFER EFFICIENCY: 45-50%
TYPE OF CHEMICAL CONTROL:
  (A) Primary paint kill by-polymeric dispersion
  (B) Secondary by polymeric flocculation/flotation restricted to the Palin Aqua-Flo units.
PRODUCT DESCRIPTION AND APPLICATION:
  TEXO LP-1235 —Active paint booth control deflocculant used at concentrations from 1:500 to 1:375 to kill and disperse
  TEXO LP-1227 —Anionic emulsion polymer used at 5-10 ppm concentration to floc, agglomerate and float treated paint sludge to the surface of the booth water for removal.
  TEXO LP-1128 —Alkaline PH control product used to adjust booth PH to approximately 9.
  TEXCO LP-864 —Booth corrosion control product used at 0.5% concentration to condition booth water. This product is only added to the booth when there is a fresh charge added to the booth.

The addition of the three products is completely done by pumps controlled by timers. The following is an outline of the equipment used to control the chemical balance of the booth:

A. A 65 gpd metering pump controlled by a one hour timer wired in series with the drives of the paint line. The pump is set at 75%, and the timer is set for 7 min. on/7 min. off, this supplies the tank with 1 gph of LP-1235.

B. A 65 gpd metering pump controlled by a one hour timer wired in series with the drives of the paint line. The pump is set at 95%, and the timer is set for 7 min. on/7 min. off, this supplies the tank with 1.35 gph of LP-1128.

C. A Stranco Polyblend model PB12-0.2 (set up with a 40 gph flow control) this unit is controlled by a 24 hour timer wired in series with a 7 day timer. The 24 hour timer is set to come on twice per day for 1 hour each time. The Polyblend unit is calibrated to supply a glend of LP-1227 at 4-5 ppm. The flow of the Polyblend is divided equally between the two Aqua-Flo units.

D. A 125 gpd metering pump wired to come on-line when ever the Polyblend unit is running. The pump is set at 95%, this supplies the tank with 5 gph of LP-1235 to replace the product lost due to dragout by the removal of sludge from the tank.

E. A 24 gpd metering pump wired in series with the drives of the paint line. The pump is set at 50%, and is operating whenever the line is running, this supplies the tank with 0.5 gph of LP-1138 (defoamer).*
* Trademark of Texco Corporation, 2801 Highland Avenue, Cincinnati, Ohio 45212

Although the equipment utilized to control the chemicals in this system may seem to be complex, in actuality once the pumps are set the only daily services needed to maintain the booths are as follows:

1. Titrate the booth water each shift to check on the accuracy of the pump functions.
2. Check once per shift to confirm that there is sufficient chemical in the drums under the pumps to supply the requirements of the system of that shift.
3. Check at the beginning of each shift to see that the pumps have not been allowed to pump dry or to loose their prime.
4. Maintain a sufficient inventory of product in the both area to guarantee there is not a break in the supply of chemical to the booth.
5. Check the function of the Aqua-Flo units, in order to maintain continuous sludge removal.

Sludge Removal System

Two Palin Aqua-Flo Consolidation units located at opposite ends of the booth. The booth has been retrofitted with both surface and submerged circulation nozzles, to aid in the movement of the overspray to the Aqua-Flo take-off weirs.

Operation and Observations of the Booth

The booth was charged with TEXO LP-1235 the primary overspray control product to a concentration of (1:350) and the pH was adjusted with Texo LP-1128 to pH of 9.2. The paint kill at this point was very good, it appeared as a very fine particle kill held in suspension. Half-way through the first shift the Stranco Polyblend unit was turned on and calibrated to supply a blend of TEXO LP-1227 at a concentration of 4–5 ppm at a flow rate of 25 gph. This flow is divided between the two Aqua-Flo units by way of a "T" fitting and two pvc needle valves. The Polyblend was run for 1 hour, the LP-1227 was introduced to the flow of the booth water in the weir boxes for the Aqua-Flo units, this guaranteed a thorough mixing of the booth water and the inverted LP-1227 because of the action of the recessed impeller pumps that feed the Aqua-Flo units. At this time a heavy floating flow was formed in both Aqua-Flo units, the floc was gray in color and very dense in consistency, the floc also exhibited excellent dewatering characteristics.

During the next five days of the test the booth water took on a light gray color, as the amount of dispersed paint reached the optimum level of operation. This optimum level of suspended solids was reached by experimentation:

a. too low of a concentration of solids and the cost of the booth control would be too high for the amount of paint sludge removed;

b. too high a concentration of suspended solids results in the formation of a stable foam which increases the amount of de-foamer needed, this also increases the cost of the booth operation; and c. too high of solids also increases the amount of particulate settling in the booth which increases the amount of man hours needed to clean the booth when the booth is dropped.

The test continued to run with excellent results with regard to the paint kill and the amount of sludge removed for approximately 30 days.

EXAMPLE IB

Misadjustments

The Polyblend unit was misadjusted to put out its maximum capacity of neat polymer, and the 94-130 metering pump on the LP-1235 was shut off. The booth water was visibly viscous and heavily concentrated with dispersed paint particles. The pH in the booth was 9.5, there was an inordinate amount of foam in the booth and the Palin units were skimming only foam.

Extensive titrations and jar tests were run, and it was concluded that the concentration of LP-1227 was in the range of 10-25 ppm in the booth water. Further jar tests were run until a combination of fresh water addition and pH adjustment was found which would start to floc the LP-1227 and the paint. The final results showed 66% of the water in the booth would have to be replaced with fresh water, the pH would have to be adjusted to 10.5 or higher and the concentration of the LP-1235 would have to be brought up to 1:350. The booth was overflowed with clean water, and over the next 2½ days the concentration of the LP-1227 was reduced to 35% of its meladjusted amount. The floc and float of the paint sludge did begin to come back to the high quality that it was before the misadjustments, supra.

Upon draining the booth there was a greater amount of settlement than expected, but the paint was all dead and easily shoveled and removed. The back sections and eliminators did show signs of build up, but again the paint was dead and was easily scraped and removed. The Palin Aqua-Flo units had very little settling in them and were hosed out with no scraping required.

EXAMPLE IC

Summary of the Operation of the Truck Sheetmetal Booth

The paint kill of the DuPont 51% vol. solids enamels in this paint booth, retrofitted to accommodate two Palin Aqua-Flo consolidation units, was the best the plant has seen in recent time. The Aqua-Flo units functioned nearly perfectly for this type of paint over-spray control, because they were used to remove both floating and dispersed or suspended paints.

The use of this or any other multi-polymeric overspray control system has certain problems, which are as follows:

1. Not titratable. Control is by experience only. The only tests that can be done are Active and Total Alkalinity titrations, pH tests and jar tests.

2. The polymer type products are great foam developers. This leads to excessive use of defoamers which increases the chemical costs per unit, and if the use of the defoamer is abused the defoamer seems to interfere with the reaction of the polymer with the paint, causing it to become slimy and retain a higher percentage of water.

3. Once the chemical balance of the booth is upset it is very difficult if not impossible to regain that balance.

4. The equipment needed to maintain the proper chemical balance is not only more complex than that used with a single component booth control product but it is much more expensive.

EXAMPLE ID

Passenger Top Coat System

TYPE OF BOOTH: Down draft booths with no water walls (an assortment of Koch, Alpha-DuBond, and Haden-Schweitzer booths)

TYPE OF BACK SECTION DESIGN: Modified Koch, Alpha-DuBond Schweitzer.

SIZE OF BOOTH: 125,000 gals., aprox. 650 lineal feet of booth

TYPE OF PAINT: DuPont 27% vol. solids LDL

VOLUME OF PAINT SPRAYED/8 HOURS: 800–1000 gals.

NUMBER OF UNITS PER HOUR: 61-62

NUMBER OF SHIFTS PER DAY: 2-8 hour shifts, 6 days/wk.

TYPE OF APPLICATION EQUIPMENT: Automatic electrostatic guns, plus conventional hand held guns

ESTIMATED TRANSFER EFFICIENCY: 40-45%

TYPE OF CHEMICAL CONTROL:
  A. Primary paint kill by polymeric dispersion
  B. Secondary by polymeric flocculation/flotation restriction to the Palin Aqua-Flo units.

PRODUCT DESCRIPTION AND APPLICATION:
  TEXO LP-1235 —Active paint booth control deflocculant used at concentrations from 1:500 to 1:375 to kill and disperse paints.
  TEXCO LP-1227 —Anionic emulsion polymer used at 5-10 ppm concentration to floc, agglomerate and float treated paint sludge to the surface of the booth water for removal.
  TEXO LP-1128 —Alkaline pH Control product used to adjust booth pH to approximately 9.
  TEXO LP-864 —Booth corrosion control product used at 0.5% concentration to condition booth water. This product is only added to the booth when there is a fresh charge added to the booth.

The addition of these products is accomplished through the use of LMI metering pumps controlled by a timer and a Stranco Polyblend unit controlled manually. The following is an outline of the equipment used to control the chemical balance in this system:

A. A LMI metering pump model B131-75S (108 gpd) set at 60%-stroke and 50%-speed, this supplied 32.4 gpd, or LP-1235. This pump was controlled by a seven day timer which was wired in series with the booth recirculation pumps. The pump ram 24 hours per day except on the weekends when the seven day timer turned it off.

B. A LMI metering pump model B131-75S (108 gpd set at 60%-stroke and 50%-speed, this supplied 32.4 gpd, of LP-1128. This pump was controlled by a seven day timer which was wired in series with the booth recirculation pumps. The pump ran 24 hours per day except on the weekends when the seven day timer turned it off.

C. A Stranco Polyblend model PB12.02 (set up with a 40 gph flow control). This unit was calibrated to supply a blend of 4-5 ppm of inverted LP-1227 at 25 gph, this flow was divided between two injection points one on each of the intake sides of the recessed impeller pumps that supply the Palin Aqua-Flo units. The Polyblend unit was totally under manual control.

Although the equipment utilized to control the chemicals in this system are somewhat complicated, in actuality once the pumps are set the only daily services needed to maintain the booths are as follows:

1. Titrate the booth water each shift to check on the accuracy of the pump functions.
2. Check once per shift to conform that there is sufficient chemical in the drums under the pumps to supply the requirements of the system of that shift.
3. Check at the beginning of each shift to see that the pumps have not been allowed to pump dry or to loose their prime.
4. Maintain a sufficient inventory of product in the booth area to guarantee there is not a break in the supply of chemical to the booth.
5. Check the function of the Aqua-Flo units, in order to maintain continuous sludge removal.
6. On Monday, Wednesday, and Friday, after the second shift has left for the night, open the ball valves on the discharge hoses coming from the Polyblend unit and plug supply cord for the polyblend unit into a 110 volt outlet. Check to make sure that the Aqua-Flot units and the air agitation system are running. Continue to run system as long as possible.

Sludge Removal System

A. The primary sludge removal system consists of 6 Hycor Roto Strainers with four-thousandths openings, these Roto Strainers discharge into an auger conveyor which in turn discharges into the sludge gondola truck. The use of these Roto strainers may serve as the first step of a two step filtration system, with the second part of the system to be Hoffman paper media type filters.

B. The secondary filtration system consists of 2 Palin Aqua-Flo consolidation units, which have been retrofitted to the main holding tank.

Operation and Observations of the Booth

The booth was charged with TEXO LP-1128 (the pH control product) to a pH of 9.5, and allowed to stabilize overnight. The next day the booth was changed with TEXO LP-1235 (the primary overspray control product) to a concentration of 1:1000, and the pH was maintained at 9.1.

The paints sprayed in this system are extremely easy to overkill if the pH is too high, and if this happens the paint overspray is digested and dispersed into the booth water in the form of extremely small particles, which visually appear to color the water gray. At this time the additions of the LP-1235 and the LP-1128 were automated with the use of the LMI pumps described in the section "PRODUCT DESCRIPTION AND APPLICATION". The booth was allowed to run for 3 shifts with no additions of LP-1227 being made. Jar tests were run every two hours on the booth water keeping track of the results of the addition of LP-1227 to the system. After the first shift was over, there was not enough dispersed paint in the system to make the addition of the LP-1227 cost effective, this condition continued through two moreshifts.

Two days later, between the first and second shift, the air agitation system was turned on along with the Aqua-Flo units. At this point, the water in the consolidation units appeared to be heavily laden with paint particulate along with stringers which indicated that the air system was indeed stirring up the bottom of the tank. The Polyblend unit was turned on, and for the first time LP-1227 was introduced to the flow of booth water from the tank to the Aqua-Flo units.

In less than 30 seconds the floc started to form and float. The floc was dark gray in color and extremely dense, it contained not only paint particles, but also stringers from the grates and third shift maintainence scrapings.

The floc appeared to have the consistency of cottage cheese, and dewatered extremely fast and completely. The water in the tank started to show signs of a definite color change (from dark gray to off white) after only 15 minutes of running the LP-1227 and the amount of the floc started to slow down. Hence, the Polyblend unit was shut down, and the Aqua-Flo units were allowed to run until all of the floating floc had been skimmed.

Over the next 2 weeks of testing, a desludging program was instituted, the Palin Aqua-flo units were allowed to run on a continuous basis with the Polyblend unit being turned on only twice per week (on Monday and Thursday nights). During the first shift of these two days, an extra amount of LP-1235 was pumped into the system to make up for the loss of product due to drag out. This program continued for the next 6 weeks with superior results with regard to sludge control and removal, with no maintenance problems.

The program was changed for the last 2 weeks prior to the dropping of the system. The operation of the Polyblend units was increased from twice per week to every night. This proved out to be very effective with regard to the total desludging of the tank and the overall cost of treating the system. When the tank was totally drained the only remaining sludge was at or below the level of the air agitation headers, and this sludge was in the consistency of wet potting soil. Clean up of the system was done quickly and easily, with most of the work being done with fire hoses.

EXAMPLE IE

Summary of the Operation of the Passenger Top Coat System

The passenger top coat system ran extremely well with the use of the three component polymer chemical systems described, supra. The sludge removal was as complete as it could be with the system of agitation present. The kill of the paint was fast and complete. The back sections and the eliminators cleaned up without any problems and showed no live paint or stalactites.

With some modifications to the air agitation system and to the sludge dewatering equipment, the system could likely be run for up to one year without dropping, with 6 months being the optimum period.

The only chemical treatment problem that was noted during the test was the fact that the scrapings from the grates did not seem to digest as rapidly as they did with the single component system. However, this did not cause any substantial problems, but did create some additional work because the stringers built up on the wiers and had to be removed by hand once per day, after which the Roto Strainers removed them from the flow of the booth water.

The use of this or any other multi-polymeric overspray control system has certain problems, which are as follows:

1. Not titratable. Control is by experience only. The only tests that can be done are active and total alkalinity titrations, pH tests and jar tests.
2. The polymer type products are great foam developers. This leads to excessive use of defoamers which increase the chemical cost per unit, and if the use of the defoamer is abused the defoamer seems to interfere with the reaction of the polymer with the paint, causing it to become slimy and retain a higher percentage of water.
3. Once the chemical balance of the booth is upset, it is very difficult to regain that balance.
4. The equipment needed to maintain the proper chemical balance is not only more complex than that used with a single component booth control product but it is much more expensive.

EXAMPLE IF

Passenger Facia Booth

TYPE OF BOOTH: Koch down draft booth with dual water walls
TYPE OF BACK SECTION DESIGN: Modified Alpha-DuBond nozzles with Koch eliminators
SIZE OF BOOTH: 10,000 gals.
TYPE OF PAINT: DuPont 31% vol. solids Elastomeric
VOLUME OF PAINT SPRAYED/8 HOURS: Each of the three booths are different and are all connected to the same supply tanks, so any volume figures would be approximate.
NUMBER OF UNITS PER HOUR: 61-62
NUMBER OF SHIFTS PER DAY: 2-8 hour shifts, 6 days/wk.
TYPE OF APPLICATION EQUIPMENT: Hand held conventional guns
ESTIMATED TRANSFER EFFICIENCY: 30-40%
TYPE OF CHEMICAL CONTROL:
  A. Primary paint kill by polymeric dispersion,
  B. Secondary by polymeric flocculation/flotation restriction to the Palin Aqua-Flo units.
PRODUCT DESCRIPTION AND APPLICATION:
- TEXO LP-1235 —Active paint booth control deflocculant used at concentrations from 1:500 to 1:375 to kill and disperse paints.
- TEXO LP-1227 —Anionic emulsion polmer used at 5-10 ppm concentration to floc, agglomerate and float treated paint sludge to the surface of the booth water for removal.
- TEXO LP-1128 —Alkaline pH Control product used to adjust booth pH to approximately 9.
- TEXO LP-864 —Booth corrosion control product used at 0.5% concentration to condition booth water. This product is only added to the booth when there is a fresh charge added to the booth.

The addition of the TEXO LP-1128 and the TEXO LP-1235 is accomplished through the use of LMI metering pumps, wired in series with the drives for the conveyor line. The following is an outline of the equipment used to control the chemical balance in this system:

A. A LMI metering pump with a maximum output of 24 gpd. set at 100%-stroke and 50%-speed, this supplied 4 gals. of TEXO LP-1128. over the 16 hours that the booth was inoperation.

B. A LMI metering pump with a maximum output of 24 gpd. set at 50%-stroke and 50%-speed, this supplied 4 gals. of TEXO LP-1235 over the 16 hours that the booth was in operation.

C. A 1 gal. can with a metering valve on the bottom discharge. This can was used to add the TEXO LP-1227 to the weir box however we wanted to disludge the system.

Although the equipment utilized to control the chemicals in this system may seem somewhat complicated, in actuality once the pumps are set the only daily services needed to maintain the booths are as follows:

1. Titrate the booth water each shift to check on the accuracy of the pump functions.
2. Check once per shift to confirm that there is sufficient chemical in the drums under the pumps to supply the requirements of the system of that shift.
3. Check at the beginning of each shift to see that the pumps have not been allowed to pump dry or to loose their prime.
4. Maintain a sufficient inventory of product in the booth area to guarantee there is not a break in the supply of chemical to the booth.
5. Check the function of the Aqua-Flo units, in order to maintain continuous sludge removal.
6. Three times per week (Monday, Wednesday, and Friday) take the one gallon can with the metering valve on the bottom, and fill it with a mix of TEXO LP-1227 and water taken from the discharge port on the Polyblend unit in the South side sludge room. Hang the can directly over the weir box and set the flow rate so it takes in the area of 45 min.-1 hour to empty the can of LP-1227.
7. Add defoamer as needed, during the desludging process, taking care to add as little as possible.

Sludge Removal System

One Palin Aqua-Flo Consolidation unit, with a single take-off weir located at the same end of the booth that the recirculation pumps draw from. The booth also has both surface and submerged circulation nozzles, to aid in the movement of the overspray to the Aqua-Flo take-off weir.

Operation and Observations of the Booth

The booth was charged with TEXO LP-1235 the primary overspray control product to a concentration of 1:1500, and the pH was adjusted with TEXO LP-1128 to a pH of 9.4. The paint kill at this point was excellent, and was dispersed as very small particles in the booth water. There was very little foam in the booth as this time. After allowing the booth to run this way for 2 days (4 shifts), the system was disludged using the TEXO LP-1227. The water in the booth completely cleared up, and a very large amount of paint sludge was removed. The sludge was gray in color and had very good dewatering characteristics.

EXAMPLE IG

Summary of the Operation of the Passenger Facia Booth

The paint kill of the DuPont 31% vol. solids Elastomeric in this small parts booth was excellent, when watched. The booths equipped with the Aqua-Flo units as the method of sludge removal do not require the total dispersion type control that the polymeric system provides. These booths can be run very effectively using the single component product TEXO LP 776. The kill is not complete enough to work well with the Aqua-Flo units. The increased kill of the three component system may not outweight the simplicity of use and the forgiving nature of the single component system, using TEXO LP-776.

EXAMPLE IIA

Paint Detackification and Removal from an Aqueous Media

EXPERIMENTAL PURPOSE

To detackify (i.e., render non-sticky) oversprayed paint entering the recirculating water of a paint spray booth, and to remove the treated solids as needed via a slip stream of recirculation water that is passed through a Palin sludge removal system.

EXPERIMENT

Three operational in-plant tests have been performed in automotive assembly plants utilizing various types and colors of paints supplied by different manufacturing suppliers, as set forth in the EXAMPLES, supra.

The results of these tests demonstrated that the Palin sludge removal system was most effective in removing desired solids in a controlled fashion during paint booth system operation. This performance allowed the booth in two of the three tests to be reactivated after the trail period with no additional booth sump cleaning as is normally experienced as routing maintenance procedure. The third test in question ran five weeks longer than the normal operation period of six weeks with reduced cleanup procedures required.

Chemical treatment was employed to facilitate paint solids removal in the Palin sludge removal equipment. The chemical program employed in this EXAMPLE was a dispersing paint detackifier, such as Betz 834,* added directly to the recirculating water of the paint spray booth. Betz 834 is a kaolin clay product. Such treatment programs are designed to effectively kill the sticky properties of the paint forming a dispersed sludge in the recirculation booth water.
*A trademark of the Betz Laboratories, Inc., Somerton Road, Trevose, Pa. 19047.

The Palin sludge removal equipment extracts the dispersed sludge from a slip stream of water that is passed through the Palin. Additional organic coagulants and/or flocculants may be fed to the inlet of the Palin to affect flotation of the previously dispersed solids, as discussed supra, and allow their removal in a controlled fashion with the Palin sludge removal equipment.

DATA SUMMARY

It was noted that when Betz GCP-834 was fed at a rate of 8–20% based on paint solids, excellent sludge production and removal via the Palin filter occurred. Lower levels of Betz GCP-834 resulted in live (undried) paint located on the beach of the Palin apparatus and on two occasions, caused the doctor blade to become fused to the beach when the doctor blade speed was adjusted too low.

EXAMPLE IIB

The above EXAMPLE IIA is repeated using Betz Polymer 3392.* The results are similarly satisfactory.

EXAMPLE IIC

The above EXAMPLE IIB is repeated using Betz Polymer 3342.* The results are similarly satisfactory.

EXAMPLE IID

The above EXAMPLE IIC is repeated using Betz Polymer 3357L.* The results are similarly satisfactory.

EXAMPLE IIE

The above EXAMPLE IID is repeated using Betz Polymer 1147L.* The results are similarly satisfactory.

EXAMPLE IIF

The above EXAMPLE IIE is repeated using Betz Polymer GCP-544* defoamer, which materially reduced the foaming in the Palin "Aqua-Flo" apparatus to enhance the efficiency of the separation.
* A trademark of the Betz Laboratories, Inc., Somerton Road, Trevose, Pa. 19047.

The basic and novel characteristics of the improved apparatus of the present inventio will be readily understood from the foregoing disclosure by those skilled in the art. It will become readily apparent that various changes and modifications may be made in the form, construction and arrangement of the improved apparatus of the present invention as set forth hereinabove without departing from the spirit and scope of the invention. Accordingly, the preferred and alternative embodiments of the present invention set forth hereinabove are not intended to limit such spirit and scope in any way.

What is claimed is:

1. A method of removing paint contamination from water comprising providing a solution to the problem of the accumulation of paint in a tank for containing the paint overspray water by:
   providing a waterfall of water of selected dimensions sufficient to provide a backdrop for spray painting;
   disposing items to be painted in front of such waterfall of water to serve as such backdrop for such spray painting;
   spray painting such items;
   collecting in a volume the overspray in the form of paint contaminated water from such waterfall subsequent to such spray painting;
   maintaining a treatment volume of water having a surface;

receiving into said treatment volume an influent flow of the paint contaminated water;

injecting a paint detackifier into the contaminated water to render the paint substantially non-sticky;

injecting a paint coagulant into the contaminated water to effect floatationability to said previously detackified paint;

directing the flow of influent within and horizontally across the upper portion of the treatment volume near the surface thereof to float the paint contamination on the surface thereof to accumulate a sludge on the surface of the treatment volume;

removing the sludge from the surface of the treatment volume; and withdrawing effluent from a bottom portion of the treatment volume in an amount equal to the amount of influent received into the treatment volume.

2. The method of claim 1 further comprising the step of maintaining the surface level of the treatment volume at a substantially constant height.

3. The method of claim 1 further comprising flowing the withdrawn effluent upwardly to maintain a weir inflow volume having a surface level even with the surface level of the treatment volume; and removing the effluent from the weir inflow volume in an amount equal to the amount of influent received into the treatment volume.

4. The method of claim 3 wherein the step of removing the effluent from the weir inflow volume comprises spilling the effluent from the weir inflow volume into a weir outflow volume.

5. The method of claim 4 further comprising the step of draining by gravity the weir outflow volume.

6. The method of claim 1 wherein the step of removing the sludge comprises scraping the sludge from the surface of the treatment volume.

7. The method of claim 6 further comprising accumulating the sludge adjacent the treatment volume for disposal.

8. The method of claim 6 wherein said scraping is carried out in the same direction across the surface of the treatment volume as direction of flow of the influent horizontally across the treatment volume.

9. The method of claim 1 further comprising the step of periodically draining away and replacing the entire treatment volume with a fresh treatment volume.

10. The method of claim 1 wherein in the paint detackifier and paint coagulant comprise the same additive.

11. The method of claim 1 further comprising the step of adding an alkaline, pH control means to the paint contaminated water.

12. The method of claim 11 wherein said pH is adjusted to approximately 9.

13. The method of claim 1 wherein said detackifier comprises approximately 8%–20% of said paint solids.

14. The method of claim 1 comprising the further step of adding a defoamer to the paint contaminated water.

15. The method of claim 1 wherein the concentration of said detackifier to said contaminated water is maintained in the range of approximately 1:500 to 1:375.

16. The method of claim 1 wherein the detackifier comprises approximately 8%–20% by weight of said paint solids.

17. The method of claim 1 wherein said paint coagulant comprises approximately 5–10 ppm of said paint contaminated water.

18. The method of claim 1 wherein said volume has therein a surface level zone near the top of said volume and has a deep level effluent zone near the bottom of said sludge tank of substantial depth.

19. The method of claim 18 wherein said step of directing of the flow within and horizontally across the surface level zone further serves to distribute the floating solids material to accumulate a concentrated solids sludge on the surface of the volume for removal and to render the deep level effluent zone relatively free of the solids contamination.

20. The method of claim 18 wherein the effluent is conveyed from the deep level effluent zone of relative freedom from solids material.

21. The method of claim 1 wherein the influent is deflected to flow oppositely within and horizontally across the surface level zone.

22. The method of claim 21 wherein said paint solids which do not immediately float are recirculated in a loop-shaped current for continuous return to the surface until said solids float.

* * * * *